United States Patent
Kim (10) Patent No.: US 11,292,353 B2
(45) Date of Patent: Apr. 5, 2022

(54) METHOD OF PROVIDING HYDROGEN FUEL CELL VEHICLE CHARGING SERVICE

(71) Applicant: Hylium Energy, Inc., Seoul (KR)

(72) Inventor: Seo Young Kim, Seoul (KR)

(73) Assignee: Hylium Industries, Inc., Osan-si (KR)

( * ) Notice: Subject to any disclaimer, the term of this patent is extended or adjusted under 35 U.S.C. 154(b) by 238 days.

(21) Appl. No.: 16/548,272

(22) Filed: Aug. 22, 2019

(65) Prior Publication Data

US 2019/0375310 A1 Dec. 12, 2019

Related U.S. Application Data

(62) Division of application No. 15/440,141, filed on Feb. 23, 2017, now Pat. No. 10,427,533.

(30) Foreign Application Priority Data

Feb. 29, 2016 (KR) .......................... 10-2016-0024646

(51) Int. Cl.
*B60L 53/30* (2019.01)
*H04W 4/02* (2018.01)
(Continued)

(52) U.S. Cl.
CPC ............. *B60L 53/305* (2019.02); *B60L 53/30* (2019.02); *B60L 58/30* (2019.02);
(Continued)

(58) Field of Classification Search
CPC ........ B60L 53/305; B60L 53/30; B60L 58/30; B60L 2240/622; B60L 2240/72;
(Continued)

(56) References Cited

U.S. PATENT DOCUMENTS

2012/0109409 A1* 5/2012 Hara ......................... B60L 3/12
701/1
2012/0173134 A1* 7/2012 Gutman ............. G01C 21/3476
701/400
(Continued)

*Primary Examiner* — Mary Cheung
(74) *Attorney, Agent, or Firm* — Osha Bergman Watanabe & Burton LLP (57) ABSTRACT

Provided is a method of providing a hydrogen fuel cell vehicle charging service, performed by a hydrogen fuel cell vehicle charging service providing server connected to a user terminal and a plurality of charging-vehicle terminals, the method including (a) analyzing a fuel usage pattern of a hydrogen fuel cell vehicle related to the user terminal and predicting a fuel charging time of the hydrogen fuel cell vehicle on the basis of the fuel usage pattern; (b) determining a charging location and a charging-performing vehicle terminal at the fuel charging time on the basis of location information of the user terminal, and providing the user terminal with a charging alarm including information regarding the charging location and the charging-performing vehicle terminal; and (c) providing the charging-performing vehicle terminal with the information regarding the user terminal and the charging location when a charging request is received from the user terminal in response to the charging alarm.

4 Claims, 8 Drawing Sheets

(51) Int. Cl.
*G01C 21/34* (2006.01)
*B60L 58/30* (2019.01)
(52) U.S. Cl.
CPC ..... *G01C 21/3469* (2013.01); *G01C 21/3476* (2013.01); *H04W 4/023* (2013.01); *B60L 2240/622* (2013.01); *B60L 2240/72* (2013.01); *B60L 2250/16* (2013.01); *B60L 2260/52* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/40* (2013.01)

(58) Field of Classification Search
CPC ............. B60L 2250/16; B60L 2260/52; G01C 32/3476; G01C 21/3469; H04W 4/023; Y02T 10/72; Y02T 90/40; Y02T 10/7072; Y02T 90/12; Y02T 90/14; Y02T 90/16; Y02T 10/70
See application file for complete search history.

(56) References Cited

U.S. PATENT DOCUMENTS

| | | | |
|---|---|---|---|
| 2014/0080022 A1* | 3/2014 | Kim ................... | H01M 8/04492 |
| | | | 429/431 |
| 2016/0006059 A1* | 1/2016 | Kwon ....................... | B60L 1/00 |
| | | | 429/434 |
| 2016/0086390 A1* | 3/2016 | Berkobin ............. | G07C 5/0808 |
| | | | 701/1 |

* cited by examiner

METHOD OF PROVIDING HYDROGEN FUEL CELL VEHICLE CHARGING SERVICE

CROSS-REFERENCE TO RELATED APPLICATION

This application claims priority to and the benefit of Korean Patent Application No. 2016-0024646, filed on Feb. 29, 2016, the disclosure of which is incorporated herein by reference in its entirety.

BACKGROUND

1. Field of the Invention

The present invention relates to technology of providing a hydrogen fuel cell vehicle charging service, and more particularly, to a method of providing a hydrogen fuel cell vehicle charging service, in which a hydrogen fuel cell vehicle and a mobile charging vehicle may get together at a specific location to perform charging.

2. Discussion of Related Art

At present, most energy consumed all over the world is generated from oil and coal which are fossil sources. In particular, it may be considered that oil such as gasoline and diesel oil is used in all vehicles. However, deposits of fossil fuels such as oil are limited, and various discharge gases and dust generated when fossil fuels are burned to obtain energy may be main causes of environmental pollution and global warming. As alternative energy that may improve the situation, there are clean energy sources such as hydrogen and new renewable energy such as water power, wind power, and solar energy. In particular, a fuel cell using hydrogen is expected as a most preferable energy source for vehicles when the efficiency of the fuel cell is considered.

That is, a vehicle employing a fuel cell using hydrogen as a power source uses water and electric power generated when hydrogen is combined with oxygen, and is thus quiet and does not emit any discharge gas. Hydrogen which is a source can be injected as quickly as in a general gas vehicle. Thus, the efficiency of the vehicle employing a fuel cell is as good as those of existing vehicles. A high-pressure hydrogen gas storage container should be provided inside a vehicle to use hydrogen, and a hydrogen charging station should be constructed in the form of a gas station to charge hydrogen. However, a hydrogen supply infrastructure has yet to be sufficiently built and thus hydrogen cannot be immediately charged when needed.

Korean Laid-Open Patent Application No. 10-2011-0077659 disclosing a hydrogen-charging station and a method of controlling the same provides a method of efficiently and safely charging hydrogen by controlling high-purity hydrogen production facilities and a high-pressure compression, storing, and charging system. Here, a method of efficiently charging hydrogen is merely provided but a solution to a case in which a vehicle needs to be charged with hydrogen during driving is not suggested. Therefore, there are still the above problems.

SUMMARY OF THE INVENTION

The present invention is directed to a method of providing a hydrogen fuel cell vehicle charging service, in which when a hydrogen fuel cell vehicle needs to be charged with hydrogen in a region in which a hydrogen-charging station does not exist, the hydrogen fuel cell vehicle and a mobile charging vehicle may get together and perform charging at a predetermined location using a user terminal related to the hydrogen fuel cell vehicle and a terminal related to the mobile charging vehicle.

The present invention is also directed to a method of providing a hydrogen fuel cell vehicle charging service, in which a fuel usage pattern of a hydrogen fuel cell vehicle is analyzed and a fuel charging time is predicted and notified to a user terminal.

The present invention is also directed to a method of providing a hydrogen fuel cell vehicle charging service, in which a charging plan including a number of times of charging and a charging location is made on the basis of an estimated fuel consumption rate according to information regarding a point of departure and a destination of a hydrogen fuel cell vehicle.

The present invention is also directed to a method of providing a hydrogen fuel cell vehicle charging service, in which when a charging request is received from a hydrogen fuel cell vehicle, a charging location and a charging-performing vehicle terminal are determined on the basis of the location of a user terminal.

According to a first aspect of an embodiment of the present invention, a method of providing a hydrogen fuel cell vehicle charging service, performed by a hydrogen fuel cell vehicle charging service providing server connected to a user terminal and a plurality of charging-vehicle terminals, includes (a) analyzing a fuel usage pattern of a hydrogen fuel cell vehicle related to the user terminal, and predicting a fuel charging time of the hydrogen fuel cell vehicle on the basis of the fuel usage pattern; (b) when the fuel charging time is reached, determining a charging location and a charging-performing vehicle terminal on the basis of location information of the user terminal, and providing the user terminal with a charging alarm including information regarding the charging location and the charging-performing vehicle terminal; and (c) providing the charging-performing vehicle terminal with the information regarding the user terminal and the charging location when a charging request is received from the user terminal in response to the charging alarm.

(a) may include determining a fuel usage pattern on the basis of data regarding a daily moving distance and a daily fuel usage of the hydrogen fuel cell vehicle; and determining a date when the amount of fuel of the hydrogen fuel cell vehicle is expected to decrease to a predetermined reference amount or less on the basis of the fuel usage pattern. The fuel usage pattern may be periodically updated.

(b) may include determining a charging location nearest to the user terminal or a charging location where the user terminal uses most frequently among at least one charging location which is within a specific range from a location of the user terminal.

(b) may include providing the user terminal with information regarding at least one charging location which is within a specific range from location of the user terminal, receiving a user's selection as to a specific charging location from the user terminal, and determining the charging location.

(b) may include determining the charging-performing vehicle terminal nearest to the charging location and having no charging performing plan among the plurality of charging-vehicle terminals on the basis of the charging location. Charging vehicles related to the plurality of charging-vehicle terminals may move according to predetermined location movement plans of the respective charging vehicles.

(c) may include providing the user terminal with an estimated moving time to the charging location and real-time location information of a charging-performing vehicle, and providing the charging-performing vehicle terminal with real-time location information of the user terminal.

According to a second aspect of an embodiment of the present invention, a method of providing a hydrogen fuel cell vehicle charging service, performed by a hydrogen fuel cell vehicle charging service providing server connected to a user terminal and a plurality of charging-vehicle terminals, includes (a) receiving information regarding a point of departure and a destination from the user terminal; (b) calculating an estimated fuel consumption rate of a hydrogen fuel cell vehicle related to the user terminal on the basis of the information regarding the point of departure and the destination; (c) determining a number of times of charging, a charging time, and a charging location on the basis of the estimated fuel consumption rate; and (d) setting a moving path of the user terminal on the basis of the charging location and the information regarding the point of departure and the destination.

(c) may include determining, on the basis of the estimated fuel consumption rate, an estimated location of the hydrogen fuel cell vehicle at the charging time when the amount of fuel is expected to decrease to a predetermined reference amount or less, and determining a charging location which is within a specific range from the estimated location.

(c) may include determining a charging-performing vehicle terminal among a plurality of charging-vehicle terminals on the basis of a distance to the charging location, a charging performing plan of a charging vehicle, and a location movement plan of the charging vehicle. Charging vehicles related to the plurality of charging-vehicle terminals may move according to predetermined location movement plans of the respective charging vehicles.

The method may further include providing the charging-performing vehicle terminal with information regarding the user terminal, the charging time, and the charging location.

According to a third aspect of an embodiment of the present invention, a method of providing a hydrogen fuel cell vehicle charging service, performed by a hydrogen fuel cell vehicle charging service providing server connected to a user terminal and a plurality of charging-vehicle terminals, includes (a) receiving a charging request from the user terminal; (b) determining a charging location on the basis of a location of the user terminal; (c) determining a charging-performing vehicle terminal among the plurality of charging-vehicle terminals on the basis of the charging location and locations of the plurality of charging-vehicle terminals; and (d) transmitting, to the user terminal, information regarding the charging location, the distance between the location of the user terminal and the charging location, and an estimated moving time, and real-time location information of the charging-performing vehicle.

(c) may include checking whether the plurality of charging-vehicle terminals are located within a specific range from the charging location, and charging performing plans of the plurality of charging-vehicle terminals. Charging vehicles related to the plurality of charging-vehicle terminals may move according to predetermined location movement plans of the respective charging vehicles.

(d) may include transmitting real-time location information of the user terminal to the charging-performing vehicle terminal.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, the advantages and features of the present invention and a method of achieving them will become more apparent from exemplary embodiments thereof with reference to the accompanying drawings. However, the present invention is not limited to the embodiments set forth herein and may be embodied in many different forms. Rather, these embodiments are provided so that this disclosure will be thorough and complete and will fully convey the concept of the invention to those of ordinary skill in the art. The scope of the invention is defined by the appended claims. Throughout the present disclosure, the same reference numerals represent the same elements. As used herein, the term 'and/or' includes any and all combinations of one or more of the associated listed items.

It will be understood that, although the terms 'first', 'second', etc., may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the technical idea of the present invention.

In operations to be described below, identification signs assigned thereto (e.g., a, b, c, etc.) are used merely for convenience of explanation. Thus, the identification signs should not be understood as describing the order of the operations and the operations may be performed in an order different from the order described herein unless the content clearly indicates otherwise. That is, the operations may be performed in the order described herein, performed substantially simultaneously, or performed in an order reverse to the order described herein.

The terms used in the present disclosure are not intended to restrict the scope of the present invention and only used to describe embodiments. As used herein, the singular forms 'a', 'an' and 'the' are intended to include the plural forms as well, unless the context clearly indicates otherwise. It will be further understood that the terms 'comprise' and/or 'comprising,' when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In describing embodiments of the present invention herein, well-known functions or constructions are not described in detail if it is determined that they would obscure the invention due to unnecessary detail. Terms which are to be described below are determined in consideration of functions in embodiments of the present invention but are variable according to a user's intention, an operator's intension, precedents, or the like. Thus, the terms used herein should be defined based on the whole context of the present invention.

Figure 1:
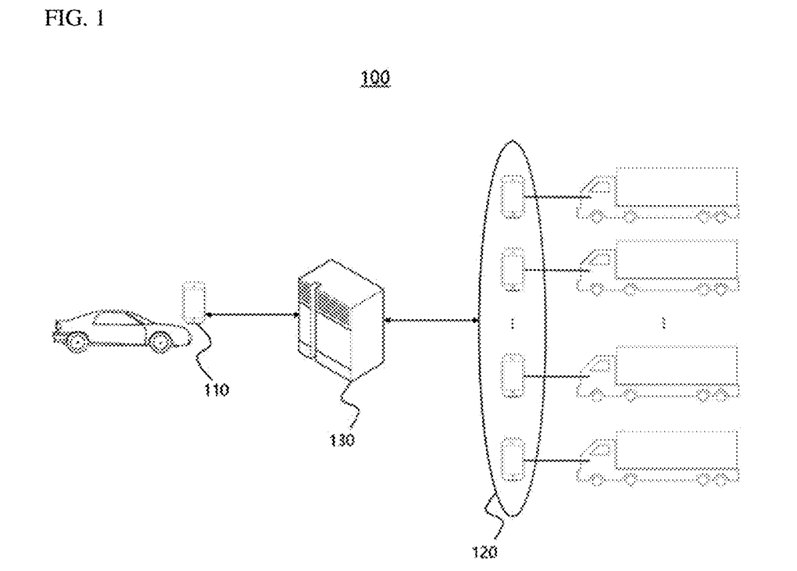
FIG. 1 is a diagram illustrating a hydrogen fuel cell vehicle charging service providing system according to an embodiment of the present invention.

FIG. 1 is a diagram illustrating a hydrogen fuel cell vehicle charging service providing system according to an embodiment of the present invention.

Referring to FIG. 1, a hydrogen fuel cell vehicle charging service providing system 100 includes a user terminal 110, charging-vehicle terminals 120, and a hydrogen fuel cell vehicle charging service providing server 130. Here, the hydrogen fuel cell vehicle charging service providing server 130 is connected to the user terminal 110 and the charging-vehicle terminals 120 via a network.

The user terminal 110 is a terminal related to a hydrogen fuel cell vehicle and may be a terminal of a user of the hydrogen fuel cell vehicle. The user terminal 110 may run an application for receiving the hydrogen fuel cell vehicle charging service from the hydrogen fuel cell vehicle charging service providing server 130, and transmit data to or receive data from the hydrogen fuel cell vehicle charging service providing server 130 so that the hydrogen fuel cell vehicle charging service providing server 130 may perform a method of providing a hydrogen fuel cell vehicle charging service.

The charging-vehicle terminals 120 are terminals related to charging vehicles storing hydrogen so as to charge a hydrogen fuel cell vehicle with hydrogen, and may be terminals of drivers who use the charging vehicles or terminals provided in the charging vehicles. In one embodiment, one or more charging vehicles may be provided. Thus, there may be one or more terminals related to the one or more charging vehicles. All the charging-vehicle terminals 120 may be connected to the hydrogen fuel cell vehicle charging service providing server 130. The charging vehicles may be moved according to predetermined location movement plans thereof. Here, the location movement plans may be set to circulate between a plurality of charging locations at predetermined time intervals.

For example, the user terminal 110 and the charging-vehicle terminals 120 may be various types of wired/wireless communication devices, e.g., computers such as a desktop personal computer (PC), a notebook PC, etc., which are connected to the hydrogen fuel cell vehicle charging service providing server 130 via a network to receive a hydrogen fuel cell vehicle charging service, or may be either general cellular phones (namely, feature phones) or open operating system (OS)-based smart phones through which users may download, freely use, and delete various desired application programs. Alternatively, the user terminal 110 and the charging-vehicle terminals 120 may be understood as communication devices including either mobile phones having a mobile office function as well as a voice/video communication function, an internet data communication function, etc. which are generally used, or all internet phones or tablet PCs, which do not have a voice communication function but are accessible to the Internet.

The hydrogen fuel cell vehicle charging service providing server 130 is a device which performs a method of providing a hydrogen fuel cell vehicle charging service while being connected to the user terminal 110 related to a hydrogen fuel cell vehicle and the charging-vehicle terminals 120. The hydrogen fuel cell vehicle charging service providing server 130 may make a database by continuously accumulating data about averages of daily fuel consumption rates of a hydrogen fuel cell vehicle, analyze a fuel consumption pattern of the hydrogen fuel cell vehicle, and provide the user terminal 110 with a charging alarm at an estimated charging time. Furthermore, when a user inputs information regarding a point of departure and a destination to the hydrogen fuel cell vehicle charging service providing server 130, the hydrogen fuel cell vehicle charging service providing server 130 may generate a fuel charging plan and provide a moving path to the user. When receiving a charging request from the user terminal 110, the hydrogen fuel cell vehicle charging service providing server 130 may enable the hydrogen fuel cell vehicle related to the user terminal 110 and a charging-performing vehicle to get together to perform charging at a specific charging location on the basis of the location of the user terminal 110, a charging location, the location of a charging vehicle, etc. In addition, the hydrogen fuel cell vehicle charging service providing server 130 may store a moving plan or a daily location movement plan of a charging vehicle beforehand, and make a database by continuously accumulating averages of daily fuel consumption rates of the hydrogen fuel cell vehicle.

Figure 2:
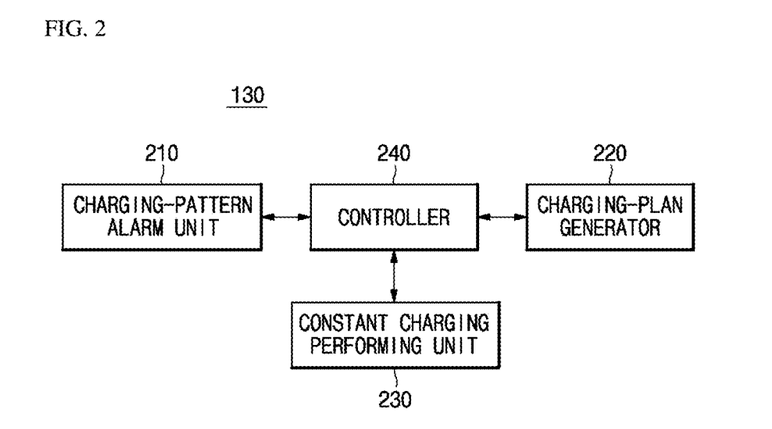
FIG. 2 is a block diagram of a hydrogen fuel cell vehicle charging service providing server of FIG. 1.
Figure 3:
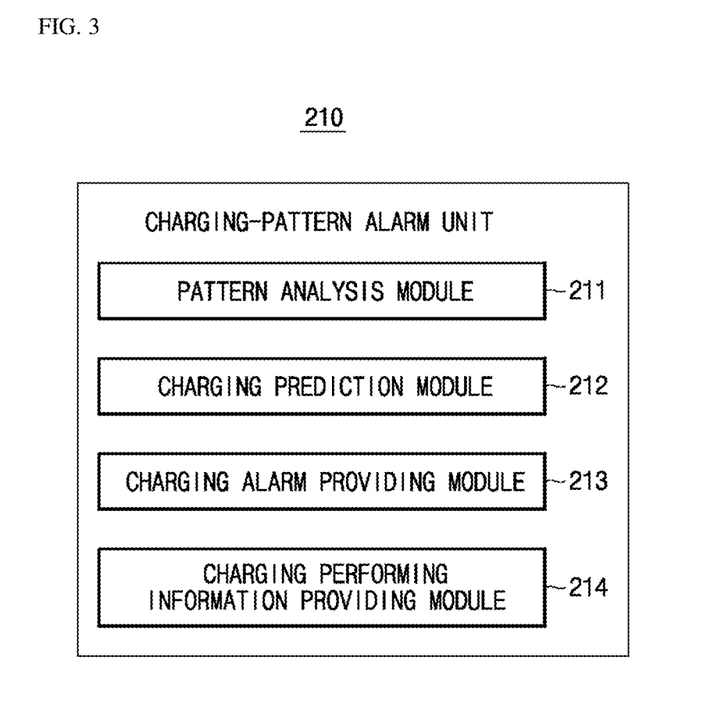
FIG. 3 is a block diagram of a charging-pattern alarm unit of FIG. 2.
Figure 4:
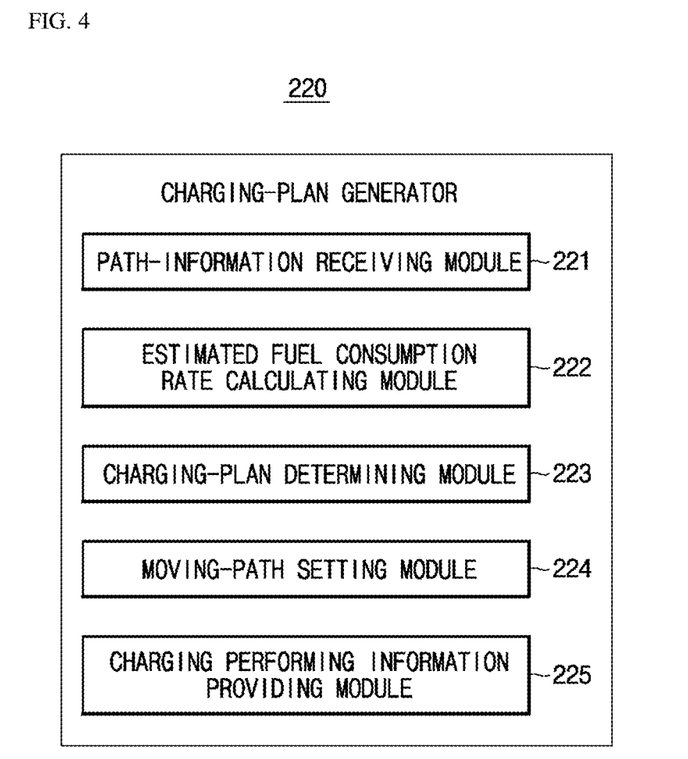
FIG. 4 is a block diagram of a charging-plan generator of FIG. 2.
Figure 5:
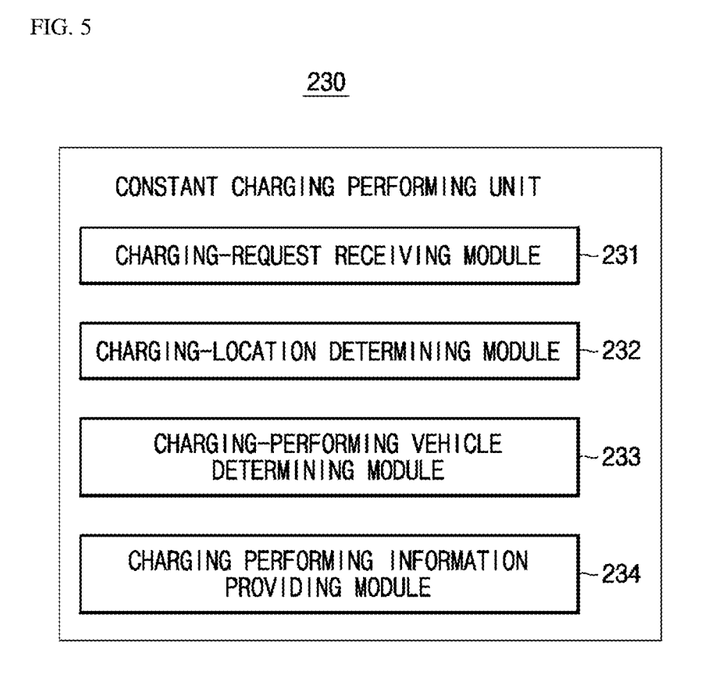
FIG. 5 is a block diagram of a constant charging performing unit of FIG. 2.

FIG. 2 is a block diagram of the hydrogen fuel cell vehicle charging service providing server 130 of FIG. 1. FIG. 3 is a block diagram of a charging-pattern alarm unit of FIG. 2. FIG. 4 is a block diagram of a charging-plan generator of FIG. 2. FIG. 5 is a block diagram of a constant charging performing unit of FIG. 2

Referring to FIG. 2, the hydrogen fuel cell vehicle charging service providing server 130 includes a charging-pattern alarm unit 210, a charging-plan generator 220, a constant charging performing unit 230, and a controller 240.

In one embodiment, the hydrogen fuel cell vehicle charging service providing server 130 may predict a fuel charging time and provide a charging alarm to the user terminal 110 through the charging-pattern alarm unit 210 even when a charging request is not received from a user, as will be described in more detail with reference to FIGS. 3 and 6 below.

Referring to FIG. 3, the charging-pattern alarm unit 210 includes a pattern analysis module 211, a charging prediction module 212, a charging alarm providing module 213, and a charging performing information providing module 214.

Figure 6:
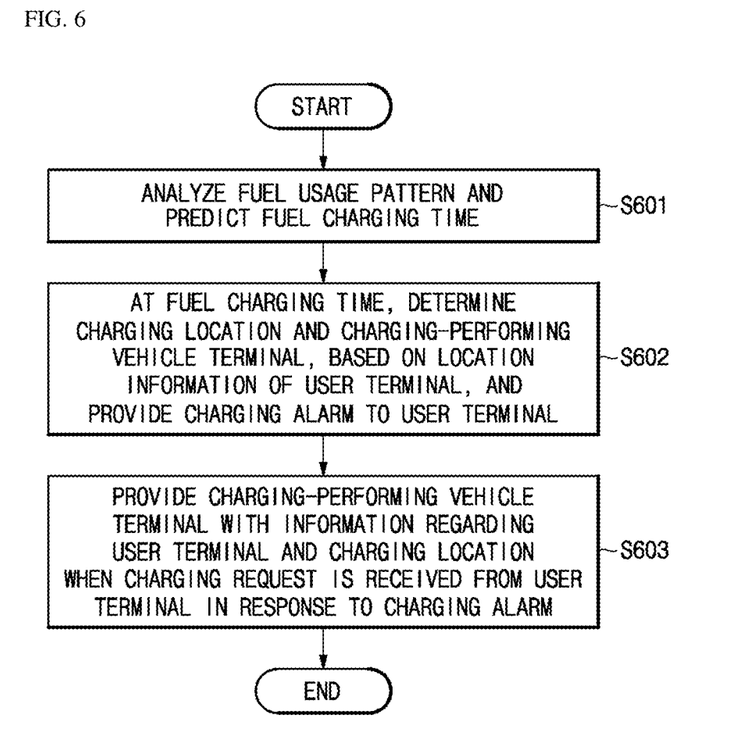
FIG. 6 is a flowchart of a method of providing a recommended hydrogen fuel cell vehicle charging service, performed by the hydrogen fuel cell vehicle charging service providing system of FIG. 1, according to an embodiment of the present invention.

Referring to FIG. 6, the pattern analysis module 211 analyzes a fuel usage pattern of a hydrogen fuel cell vehicle related to the user terminal 110, and the charging prediction module 212 predicts a fuel charging time of the hydrogen fuel cell vehicle on the basis of the fuel usage pattern (operation S601). The pattern analysis module 211 may determine the fuel usage pattern on the basis of data regarding a daily moving distance and a daily fuel usage of the hydrogen fuel cell vehicle. Here, the fuel usage pattern may be periodically updated. The charging prediction module 212 may also determine a date when the amount of a fuel of the hydrogen fuel cell vehicle will decrease to a predetermined reference amount or less on the basis of the fuel usage pattern.

For example, when a user uses a hydrogen fuel cell vehicle to commute, a moving distance pattern of the user in units of days of the week may be analyzed (e.g., movement between home and the vicinity of a workplace from Monday to Friday and long-distance movement on Saturday and Sunday), and a fuel usage pattern may be also analyzed (e.g., a fuel usage is uniform and relatively low from Monday to Friday and is not uniform and relatively high on Saturday and Sunday). Furthermore, the pattern analysis module 211 may predict that a fuel charging time is 22 or 23 Feb. 2016, i.e., that the hydrogen fuel cell vehicle should be charged with fuel on 22 or 23 Feb. 2016, based on the analyzed pattern.

At the fuel charging time predicted by the pattern analysis module 211, the charging alarm providing module 213 determines a charging location and a charging-performing vehicle terminal on the basis of location information of the user terminal 110, and provides a charging alarm to the user terminal 110 (operation S602). Here, the charging alarm may include information regarding the charging location and the charging-performing vehicle terminal. That is, even if a charging request is not received from a user, the charging alarm providing module 213 may provide the charging alarm to the user terminal 110 so that the user may notice that the hydrogen fuel cell vehicle should be charged.

The charging alarm providing module 213 may determine either a charging location nearest to the user terminal 110 or a charging location at which the user terminal 110 has used most frequently among at least one charging location that is within a specific range from the location of the user terminal 110. Here, the charging location may be understood as a place where the hydrogen fuel cell vehicle may get together with a charging vehicle to perform charging, may be set beforehand, and information thereof may be stored in the hydrogen fuel cell vehicle charging service providing server 130.

Figure 9:
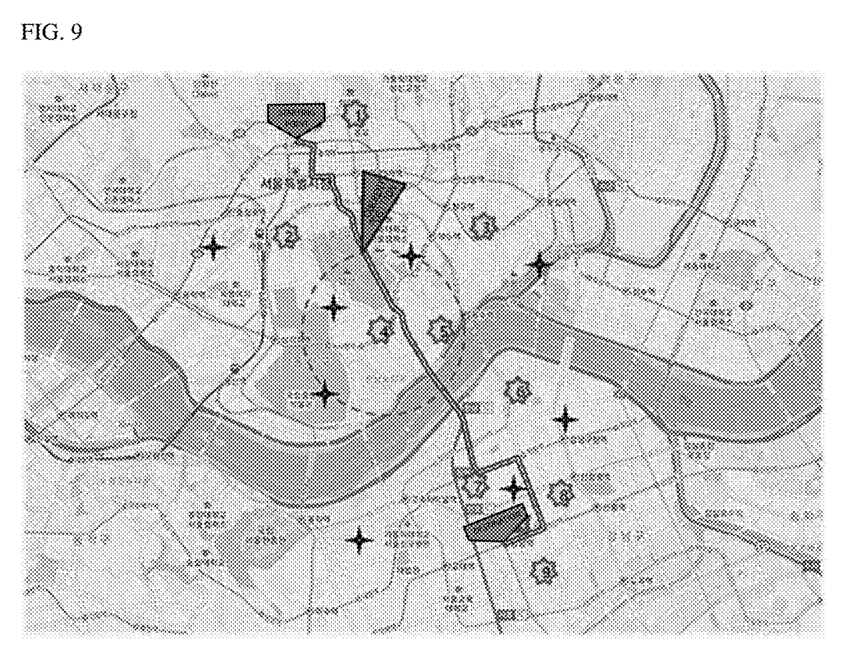
FIG. 9 is a diagram illustrating a hydrogen fuel cell vehicle charging service according to another embodiment of the present invention.

More specifically, referring to FIG. 9, the charging alarm providing module 213 may determine a charging location nearest to the user terminal 110 among at least one charging location which is within a specific range from a current location of the user terminal 110. Here, the specific range from the current location of the user terminal 110 may be set in consideration of a moving path or direction of the user terminal 110 or be set to be a specific radius from the user terminal 110 or less. The specific range may be set variously. In FIG. 9, a charging location 4 nearest to the current location of the user terminal 110 may be determined in consideration of a moving path of the user terminal 110.

Alternatively, the charging location may be determined to be a charging location where the user terminal 110 has been used most frequently regardless of the current location of the user terminal 110. In this case, information regarding charging locations where the user terminal 110 has been located may be separately collected and stored.

Furthermore, the charging alarm providing module 213 may provide the user terminal 110 with information regarding all charging locations which are within a specific range from the location of the user terminal 110, receive information regarding a user's selection as to a specific charging location from the user terminal 110, and then determine a charging location. For example, referring to FIG. 9, the charging alarm providing module 213 may provide the user terminal 110 with information regarding charging locations 4 and 5, and determine the charging location 5 when the charging location 5 is selected by the user.

The charging alarm providing module 213 may determine a charging-performing vehicle terminal nearest to the determined charging location and having no charging-performing plan among a plurality of charging-vehicle terminals on the basis of the determined charging location. Here, the charging-performing vehicle terminal is a terminal related to a charging-performing vehicle. The charging-performing vehicle is a charging vehicle which will get together at a specific charging location with a hydrogen fuel cell vehicle requesting to be charged and provide fuel to the hydrogen fuel cell vehicle. The charging performing plan represents whether the charging vehicle has a plan to move to a specific charging location so as to charge another hydrogen fuel cell vehicle with fuel.

The charging alarm providing module 213 may check whether the charging-vehicle terminals 120 are within a specific range from a charging location, and charging performing plans of the charging-vehicle terminals 120. For example, referring to FIG. 9, when the charging location 4 is determined, the charging alarm providing module 213 may determine a charging vehicle having no charging performing plan (e.g., having no scheduled plan to charge another hydrogen fuel cell vehicle) and nearest to the charging location 4 or may determine a charging vehicle having no charging performing plan and located on the charging location 4 or planned to move to the charging location 4 on the basis of a location movement plan, among charging vehicles (indicated by a cross shape) which are within a specific range (as indicated by a dot line) from the charging location 4.

When receiving a charging request from the user terminal 110 in response to a charging alarm, the charging performing information providing module 214 provides the charging-performing vehicle terminal with information regarding the user terminal 110 and the charging location (operation S603). That is, a user may determine whether a hydrogen fuel cell vehicle is to be charged or not in response to the charging alarm, and request to charge the hydrogen fuel cell vehicle.

When the user requests to charge the hydrogen fuel cell vehicle in response to the charging alarm, the charging performing information providing module 214 may provide the user terminal 110 with an estimated moving time to the charging location and real-time location information of the charging-performing vehicle, and provide the charging-performing vehicle terminal with real-time location information of the user terminal 110.

Figure 7:
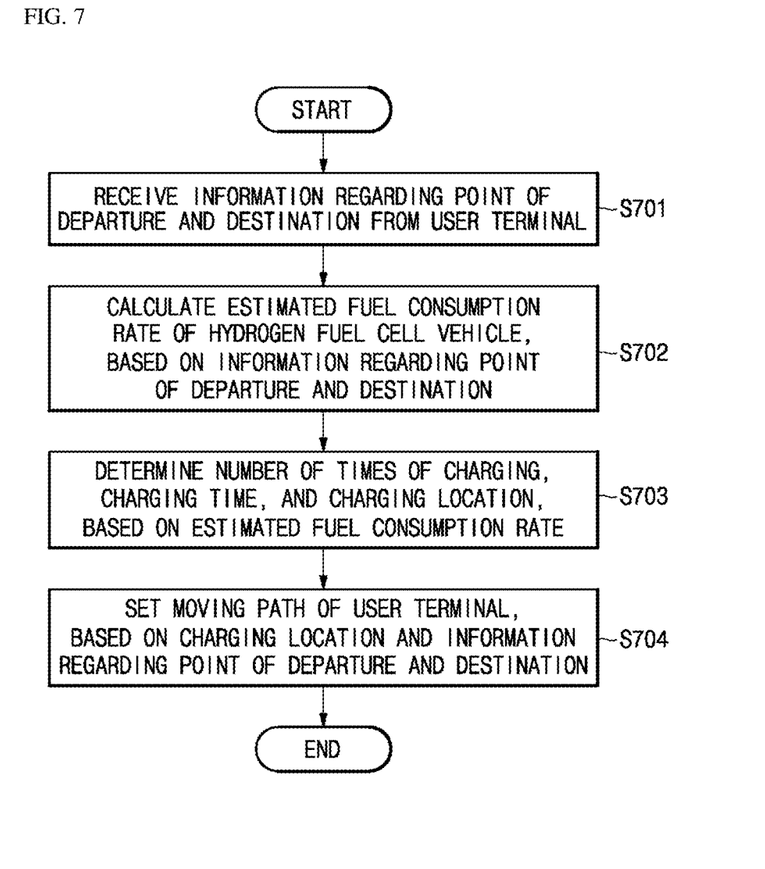
FIG. 7 is a flowchart of a method of providing a recommended hydrogen fuel cell vehicle charging service, performed by the hydrogen fuel cell vehicle charging service providing system of FIG. 1, according to another embodiment of the present invention.

In another embodiment, when information regarding a point of departure and a destination is received from a user, the hydrogen fuel cell vehicle charging service providing server 130 may generate a charging plan and set a moving path from the point of departure to the destination through the charging-plan generator 220 on the basis of an estimated fuel consumption rate, as will be described in more detail with reference to FIGS. 4 and 7 below.

Referring to FIG. 4, the charging-plan generator 220 includes a path-information receiving module 221, an estimated fuel consumption rate calculating module 222, a charging-plan determining module 223, a moving-path setting module 224, and a charging performing information providing module 225.

The path-information receiving module 221 receives information regarding a point of departure and a destination from the user terminal 110 (operation S701). The path-information receiving module 221 may generate an estimated moving path on the basis of the information regarding the point of departure and the destination received from the user terminal 110.

The estimated fuel consumption rate calculating module 222 calculates an estimated fuel consumption rate of the hydrogen fuel cell vehicle on the basis of the information regarding the point of departure and the destination (operation S702). The estimated fuel consumption rate calculating module 222 may calculate an estimated fuel consumption rate when the hydrogen fuel cell vehicle moves at a predetermined speed in the estimated moving path from the point of departure to the destination.

The charging-plan determining module 223 determines a number of times of charging, a charging time, and a charging location on the basis of the estimated fuel consumption rate (operation S703). The charging-plan determining module 223 may determine an estimated location of the hydrogen fuel cell vehicle at a charging time when the amount of fuel of the hydrogen fuel cell vehicle will decrease to a predetermined reference amount or less on the basis of the estimated fuel consumption rate, and determine a charging location which is within a specific range from the estimated location. Here, a method of determining the charging location is the same as the method of determining a charging location through the charging alarm providing module 213 described above. Although not described in detail here, the charging-plan determining module 223 determines the charging location using the above method on the basis of the estimated location of the hydrogen fuel cell vehicle.

The charging-plan determining module 223 may determine a charging-performing vehicle terminal among the charging-vehicle terminals 120 on the basis of a distance to the charging location, a charging performing plan of a charging vehicle, and a location movement plan of the charging vehicle. Here, a method of determining the charging-performing vehicle terminal is the same as the method of determining a charging-performing vehicle terminal through the charging alarm providing module 213 described above, and is thus not described in detail again here.

The moving-path setting module 224 sets a moving path of the user terminal 110 on the basis of the charging location and information regarding a point of departure and a destination (operation S704). That is, the moving-path setting module 224 may set a moving path including the charging location determined by the charging-plan determining module 223 among paths from the point of departure to the destination.

The charging performing information providing module 225 provides the charging-performing vehicle terminal with information regarding the user terminal 110, the charging time, and the charging location. The charging-performing vehicle moves to the charging location at the charging time and charges the hydrogen fuel cell vehicle on the basis of this information.

Figure 8:
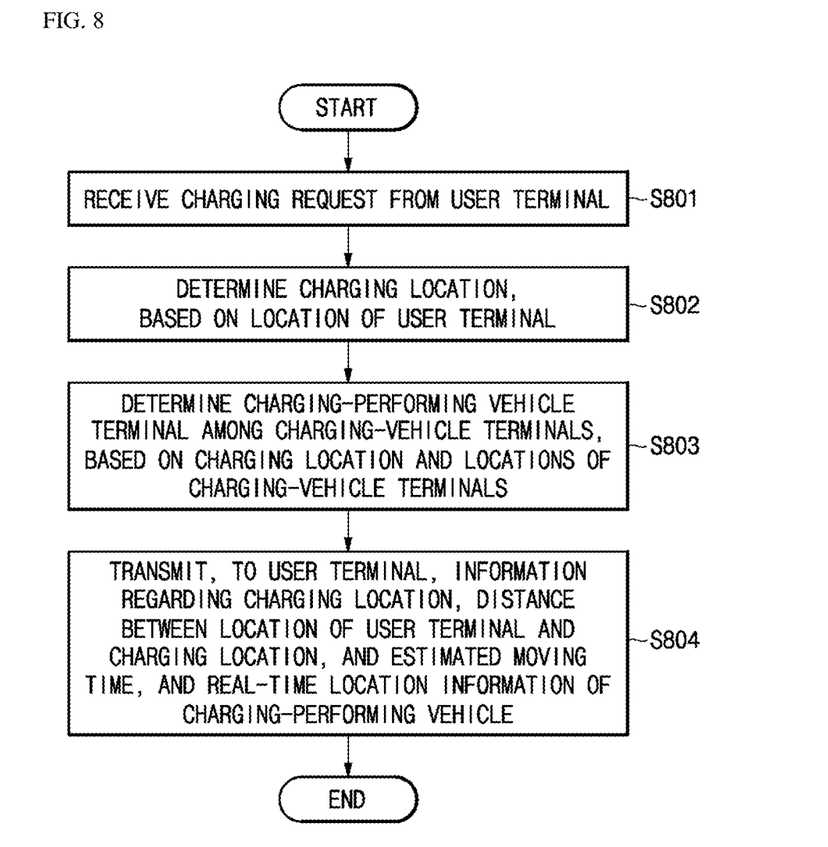
FIG. 8 is a flowchart of a method of providing a recommended hydrogen fuel cell vehicle charging service, performed by the hydrogen fuel cell vehicle charging service providing system of FIG. 1, according to another embodiment of the present invention.

In another embodiment, when a charging request is received from a user, the hydrogen fuel cell vehicle charging service providing server 130 may determine, through the constant charging performing unit 230, a charging location on the basis of the location of a user and determine a charging-performing vehicle terminal on the basis of the charging location, as will be described in more detail with reference to FIGS. 5 and 8 below.

The constant charging performing unit 230 includes a charging-request receiving module 231, a charging-location determining module 232, a charging-performing vehicle determining module 233, and a charging performing information providing module 234.

The charging-request receiving module 231 receives a charging request from the user terminal 110 (operation S801). For example, when a user checks the amount of remaining fuel of a hydrogen fuel cell vehicle and determines that the hydrogen fuel cell vehicle needs to be charged, the user may request the hydrogen fuel cell vehicle charging service providing server 130 to charge the hydrogen fuel cell vehicle through an application for providing a method of providing a hydrogen fuel cell vehicle charging service, the application being stored in the user terminal 110.

The charging-location determining module 232 determines a charging location on the basis of the location of the user terminal 110 (operation S802). The charging-performing vehicle determining module 233 determines a charging-performing vehicle terminal among the charging-vehicle terminals 120 on the basis of the charging location and the locations of the charging-vehicle terminals 120 (operation S803). Here, a method of determining the charging location and a method of determining the charging-performing vehicle terminal are the same as the method of determining the charging location and the method of determining the charging-performing vehicle terminal described above, performed by the charging alarm providing module 123, and are thus not described in detail again here.

The charging performing information providing module 234 transmits, to the user terminal 110, information regarding the charging location, the distance between the location of the user terminal 110 and the charging location, and an estimated moving time, and real-time location information of the charging-performing vehicle (operation S804). Furthermore, the charging performing information providing module 234 may transmit real-time location information of the user terminal 110 to the charging-performing vehicle terminal. Through the above information, each of the user terminal 110 and the charging-performing vehicle terminal may determine the location of the other in real time.

The controller 240 controls operations of the charging-pattern alarm unit 210, the charging-plan generator 220, and the constant charging performing unit 230, and the flow of data.

Although it is described that the above three embodiments are performed by one hydrogen fuel cell vehicle charging service providing server 130, the present invention is not limited thereto and these embodiments may be performed by different servers.

As described above, according to the present invention, a hydrogen fuel cell vehicle may be charged through a mobile charging vehicle even in a region in which a hydrogen-charging station does not exist, and may get together with a charging vehicle to perform charging at an optimum location based on the location of a user terminal related to the hydrogen fuel cell vehicle, such as either a nearest charging location or a charging location which is in a moving path of the hydrogen fuel cell vehicle.

A moving distance pattern and a fuel usage pattern of a hydrogen fuel cell vehicle may be analyzed to predict a fuel charging time of the hydrogen fuel cell vehicle, and a charging alarm may be provided at the fuel charging time even when a charging request is not received from a user, so that the user may perform fuel charging.

Furthermore, a charging plan of a hydrogen fuel cell vehicle, including a number of times of charging, a charging location, etc., may be made on the basis of information regarding a point of departure and a destination of the hydrogen fuel cell vehicle.

In addition, when a user of a hydrogen fuel cell vehicle requests to charge the hydrogen fuel cell vehicle by him/herself, fuel charging may be directly performed by determining a charging location and a charging-performing vehicle terminal on the basis of the location of a user terminal.

A method of providing a hydrogen fuel cell vehicle charging service according to an embodiment of the present invention may be embodied as a computer-readable code in a computer-readable recording medium. The computer-readable recording medium may be any recording apparatus capable of storing data that is read by a computer system.

Examples of the computer-readable recording medium include a read-only memory (ROM), a random access memory (RAM), a compact disc (CD)-ROM, a magnetic tape, a hard disk, a floppy disk, a portable storage medium, a non-volatile memory (a flash memory), an optical data storage device, and so on.

Furthermore, the computer-readable recording medium can be distributed among computer systems that are interconnected through a computer communication network, and the present invention may be stored and implemented as a computer-readable code in a distributed manner.

While a method of providing a hydrogen fuel cell vehicle charging service, a hydrogen fuel cell vehicle charging service providing server configured to perform the method, and a recording medium storing the method according to embodiments of the present invention have been described above, the present invention is not limited thereto. Various modifications can be made to the embodiments of the present invention without departing from the scope of the invention defined in the claims and specification of the invention, and the appended drawings. Thus, it is intended that the present invention covers all such modifications provided they come within the scope of the appended claims and their equivalents.

What is claimed is:

1. A method of providing a hydrogen fuel cell vehicle charging service, performed by a hydrogen fuel cell vehicle charging service providing server connected to a user terminal and a plurality of charging-vehicle terminals, the method comprising:
   (a) receiving information regarding a point of departure and a destination from the user terminal;
   (b) calculating an estimated moving path on the basis of the information regarding the point of departure and the destination, and calculating an estimated fuel consumption rate of a hydrogen fuel cell vehicle related to the user terminal in the estimated moving path;
   (c) determining, on the basis of the estimated fuel consumption rate, an estimated location of the hydrogen fuel cell vehicle at the charging time when the amount of fuel is expected to decrease to a predetermined reference amount or less, and determining a number of times of charging, a charging time, and a charging location which is within a specific range from the estimated location; and
   (d) setting a moving path of the user terminal on the basis of the charging location and the information regarding the point of departure and the destination.

2. The method of claim 1, wherein (c) comprises determining a charging-performing vehicle terminal among a plurality of charging-vehicle terminals on the basis of a distance to the charging location, a charging performing plan of a charging vehicle, and a location movement plan of the charging vehicle,
   wherein charging vehicles related to the plurality of charging-vehicle terminals move according to predetermined location movement plans of the respective charging vehicles.

3. The method of claim 1, further comprising providing a charging-performing vehicle terminal with information regarding the user terminal, the charging time, and the charging location.

4. A non-transitory computer-readable recording medium, configured to store one or more programs that, when executed by a computer or server, cause the computer or server to perform a method of providing a hydrogen fuel cell vehicle charging service, the method comprising:
   (a) receiving information regarding a point of departure and a destination from the user terminal;
   (b) calculating an estimated moving path on the basis of the information regarding the point of departure and the destination, and calculating an estimated fuel consumption rate of a hydrogen fuel cell vehicle related to the user terminal in the estimated moving path;
   (c) determining, on the basis of the estimated fuel consumption rate, an estimated location of the hydrogen fuel cell vehicle at the charging time when the amount of fuel is expected to decrease to a predetermined reference amount or less, and determining a number of times of charging, a charging time, and a charging location which is within a specific range from the estimated location; and
   (d) setting a moving path of the user terminal on the basis of the charging location and the information regarding the point of departure and the destination.

* * * * *